Figure 1:
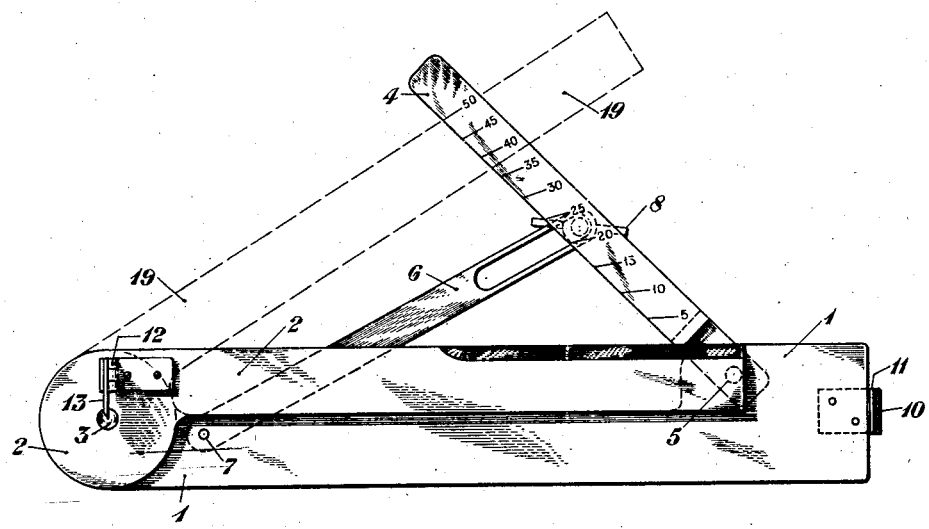

Aug. 30, 1927.

H. S. PERCIVAL

MEASURING INSTRUMENT

Filed April 17, 1923

1,640,425

2 Sheets-Sheet 1

INVENTOR
H. S. Percival
BY
ATTORNEY

Aug. 30, 1927.

H. S. PERCIVAL 1,640,425

MEASURING INSTRUMENT

Filed April 17, 1923

2 Sheets-Sheet 2

INVENTOR
H. S. Percival
BY
ATTORNEY

Patented Aug. 30, 1927.

1,640,425

UNITED STATES PATENT OFFICE.

HARRY S. PERCIVAL, OF ELMHURST, NEW YORK, ASSIGNOR TO AMERICAN TELEPHONE AND TELEGRAPH COMPANY, A CORPORATION OF NEW YORK.

MEASURING INSTRUMENT.

Application filed April 17, 1923. Serial No. 632,720.

This invention relates to instruments for use in finding certain horizontal measurements, and more particularly to instruments for finding the "pull", a distance to be found in connection with the guying of corner poles carrying electric wires or cables.

In determining the size of the guy or guys required for these corner poles, it is necessary to find, among several measurements, the distance known as the "pull". Suppose X (see Fig. 5 of the drawing) to be the corner pole, A the next pole in one direction, and B the next pole in the other direction. According to the standard practice, a point (which may be called P) one hundred feet from X on the line XA is determined, and likewise a second point (which may be called Q) one hundred feet from X on the line XB is determined. These two points P and Q are joined by a straight line, and a perpendicular is dropped from X to the line PQ. This perpendicular distance is known as the "pull".

The principal object of applicant's invention is to provide an instrument by means of which measurements such as that indicated above can be made without any change of position on the part of the operator, resulting in greater accuracy of measurement and a material reduction of the time required for the completion of the operation. A further object of the invention is to provide an instrument which can be folded extremely compactly, overcoming the disadvantage present in the necessity of carrying in field work a cumbersome device.

Applicant's instrument in common with many measuring instruments includes a calibrated scale, a sighting arm which may be placed in fixed relation with the scale and a movable arm pivoted to the fixed arm and slidable over the scale.

The first object is attained by mounting a mirror on the movable arm, as more fully disclosed below, thus enabling the operator to take the two sightings from a single position and very quickly. The second object is attained by the novel construction and arrangement of the several parts of the instrument, as more fully disclosed below.

Figure 2:
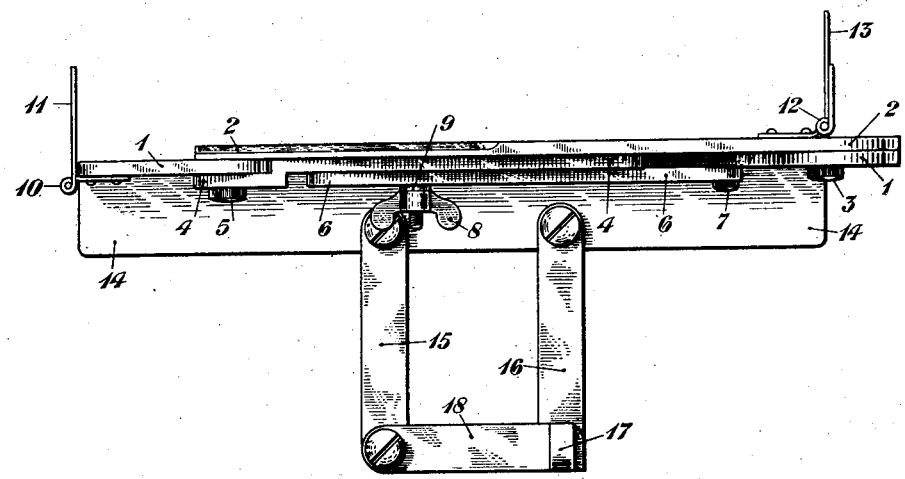
Figure 3:
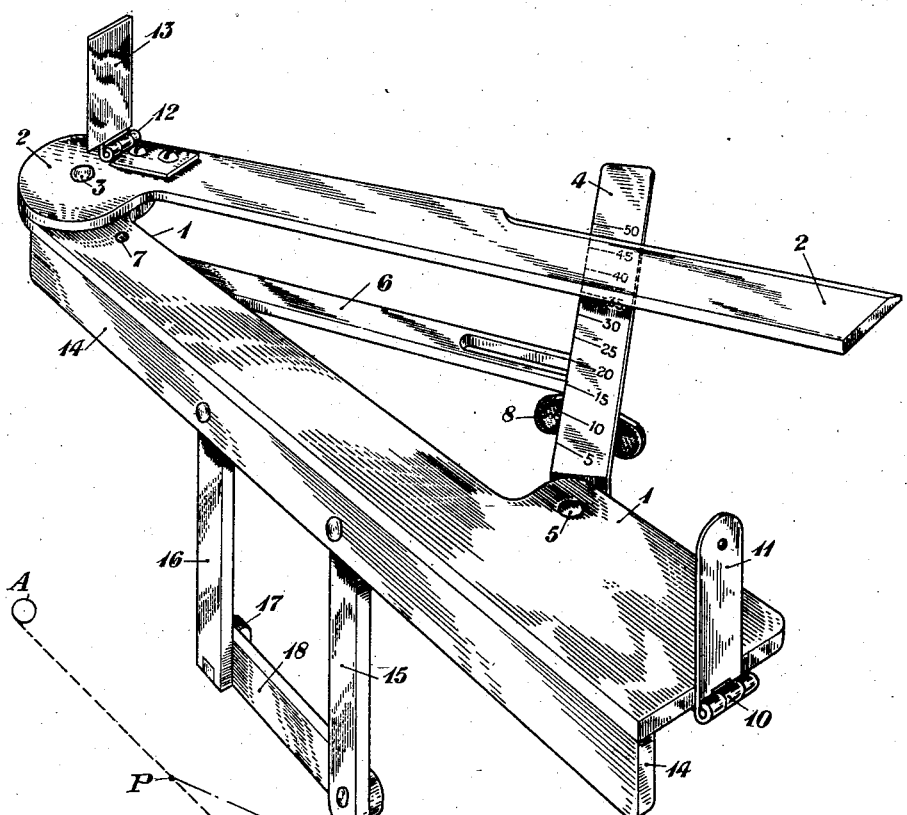
Figure 5:
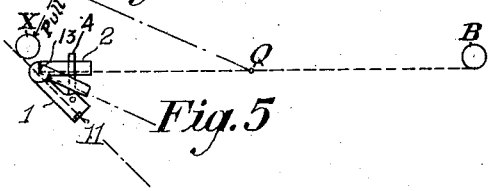
Figure 4:
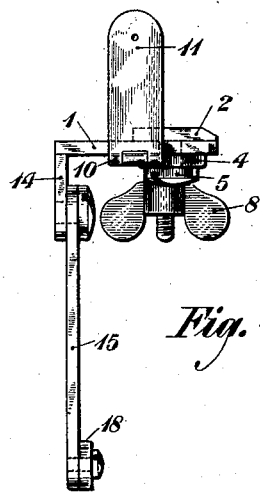

Applicant's invention will be more clearly understood when the following detailed description of one desirable embodiment is read with reference to the accompanying drawing. Fig. 1 of the drawing shows a top plan view of the instrument, with the several parts in their operative positions. Fig. 2 shows a side elevation view taken from that side which lies uppermost in Fig. 1, with the movable arm and the scale in their folded positions. Fig. 3 shows a perspective view of the instrument in its operative position. Fig. 4 shows an end elevation view taken from that end which lies to the right in Figs. 1 and 3 and to the left in Fig. 2, with the movable arm and the scale in their folded positions. Fig. 5 shows diagrammatically the position of the three poles with the instrument in the proper position for taking the reading, the size of the instrument being exaggerated for the sake of clarity. Like numerals of reference in the several figures of the drawing designate corresponding parts of the device.

It is to be understood that this detailed description of one desirable form of the instrument is merely for the purpose of illustration, and does not limit the scope of the invention, which is determined by the appended claims.

With reference to the details of the drawing, 1 is the fixed arm, and 2 is the movable arm, which is pivotally attached to the fixed arm by the rivet 3. In Fig. 1 certain portions of the arm 1 lying below and so covered by the arm 2 are indicated by broken lines. The member 4, pivoted to the fixed arm 1 at 5, carries the scale, which is graduated with reference to the pivotal point 3 as center. This member is so formed that when it is folded it fits against the side edge of the arm 1, and when it is extended its upper surface is on a level with the upper surface of arm 1 (see Fig. 2). The member 6, pivotally attached to the arm 1 at 7, is slotted at its free end, and a thumb nut 8, traveling on a screw which engages with the member 4, serves to hold the two members in the desired relation. When the instrument is folded, the two collapse or fold together against the fixed arm 1, 4 lying above 6. In the operative position of the instrument, the loosening of the thumb nut 8 allows the two members to pivot to the positions shown clearly in Fig. 1. The nut is tightened to secure the two members in position. The scale carried by the member 4 is calibrated so as to give proper readings in this extended position of the member, as more fully explained below.

At the middle of the open end of the fixed arm 1, or that end which does not carry the movable arm in pivotal relation, there is mounted by means of the hinge 10 a peep sight 11 having its opening in a vertical plane with the long axis of the arm 1. This peep sight is shown in its operative position in the drawing. When the instrument is folded, the sight folds under the fixed arm 1. At the pivotal end of the movable arm 2 there is mounted by means of the hinge 12 a mirror 13. This mirror, when in its operative position, has one lateral edge coincident with the axis of the rivet 3—that is, in a vertical line with the pivotal point of the two arms 1 and 2. It is obvious that this lateral edge of the mirror will serve as a line sight in connection with the peep sight 11, mounted as indicated above, for the purpose of sighting along the fixed arm 1. Furthermore, the reflecting surface of the mirror lies perpendicular to the long axis of the movable arm 2, on which it is mounted. Hence it is clear that the operator, sighting through the peep sight 11, can without change of position sight along the fixed arm 1 and at the same time shift the movable arm 2 until the mirror reflects the pole in the other direction from that in which the fixed arm is sighted—thus taking the front sighting and the back sighting simultaneously, forming an angle equal to one-half of the angle supplementary to the corner angle, and establishing the position of the arm 2, which indicates the "pull" in feet on the scale. When the instrument is folded, the mirror 13 is folded flat against the upper surface of the arm 2.

The fixed arm 1 carries a downwardly extending flange 14, which serves two purposes—to carry the handle and to form a partial casing for certain parts of the instrument when folded (see Figs. 2 and 4). The handle, clearly shown extended in Figs. 2, 3 and 4, comprises the members 15 and 16 pivotally attached to the flange 14 and the member 18 pivotally attached to the free end of the member 15. The member 16 terminates in a hook 17 which is designed to hold the notched free end of the member 18, as shown in Figs. 2 and 3. When the instrument is folded, 15 and 18 collapse and fold against the left end of the flange 14 (reference to Fig. 2), while 16 folds against the right end of the flange 14.

The arm 2, shown in solid lines in its folded position in Fig. 1, is moved by the operator without any shift of the position of his body, as indicated above, until the mirror 13 gives at its left edge the reflection desired. The broken lines of Fig. 1 indicate at 19 one operative position of the arm 2 (also see Fig. 3). The scale, carried by the member 4, is so calibrated that when the arm 2 is folded against the arm 1, bringing the reflecting surface of the mirror 13 perpendicular to the long axis of the arm 1 as well as the long axis of the arm 2, the reading at the upper edge (Fig. 1) of the arm 2, which is bevelled, will be zero, indicating a "pull" of zero feet, corresponding to a straight angle at the "corner". It is understood that as the angle between the two pole lines which meet at the corner becomes smaller—that is, as the corner becomes sharper—the "pull" measured in feet becomes greater. The scale is graduated and calibrated so as to allow the true reading in feet of "pull" to be indicated by the arm 2 in any position in which it may be placed by the back sighting, this reading increasing as the corner angle becomes smaller and the supplementary angle between the arms of the instrument becomes greater.

Briefly the operation of the instrument is as follows (see Fig. 5): The operator, holding the instrument close to the corner pole X and looking through the peep sight 11, brings the left edge of the mirror 13, the side of the corner pole, and the side of the next pole in front of him, A, into the line of sight. With the instrument held firmly in this postion, the movable arm 2, carrying the mirror 13, is pivoted until the corresponding side of B, the next pole in the other direction—that is, to the operator's right rear—is reflected from the left edge of the mirror. The reading is then taken on the scale at the bevelled edge of the movable arm 2. It is obvious that this operation requires the minimum of time and the minimum of labor for its execution.

The folding arrangements of the various parts of the instrument are to be noted. It will be seen from an examination of Figs. 1, 2 and 4 that when completely folded the instrument has an extreme length equal to the length of the arm 1, an extreme width equal to the width of the arm 1 at its open end (right, in Fig. 1), and an extreme depth equal to the depth of the flange 14 (see Fig. 2). In addition the folded parts are neatly arranged, and no part projects from the main mass. This feature makes the instrument extremely easy to carry in the field.

What is claimed is:

1. An instrument of the class described comprising a fixed arm, a calibrated scale pivoted to and fixable with relation to said fixed arm, a movable arm pivoted to one end of said fixed arm and slidable over said scale, sighting means on the other end of said fixed arm, and a mirror mounted on said movable arm at the pivotal end thereof in a plane perpendicular to the upper and lower surfaces and to one long edge of said arm.

2. An instrument of the class described comprising a fixed arm, a calibrated scale pivoted to and fixable with relation to said fixed arm, a movable arm pivoted to one end of said fixed arm and slidable over said scale, sighting means on the other end of said fixed arm, and a mirror mounted on said movable arm at the pivotal end thereof in a plane perpendicular to the upper and lower surfaces and to one long edge of said arm, said mirror having one lateral edge in a vertical line with the pivotal point of the two arms.

3. In an instrument of the class described including a fixed arm, a calibrated scale flexible with relation to said fixed arm, a movable arm pivoted to one end of said fixed arm and slidable over said scale, and sighting means on the other end of said fixed arm; a mirror mounted on said movable arm at the pivotal end thereof in a plane perpendicular to the upper and lower surfaces and to one long edge of said arm.

4. An instrument of the class described comprising a fixed arm bearing a downwardly extending flange, a handle pivoted to and designed to fold against said flange, a calibrated scale pivoted to, fixable in its operative position with relation to, and designed to fold against said fixed arm, a movable arm pivoted to one end of said fixed arm and slidable over said scale in the operative position thereof, a foldable peep sight at the open end of said fixed arm, and a mirror hinged to said movable arm, said mirror in its operative position being in a plane perpendicular to the upper and lower surfaces and to one long edge of said movable arm and having one lateral edge in a vertical line with the pivotal point of the two arms.

In testimony whereof, I have signed my name to this specification this 16th day of April, 1923.

HARRY S. PERCIVAL.